(12) United States Patent
Ohwi

(10) Patent No.: US 6,813,591 B1
(45) Date of Patent: Nov. 2, 2004

(54) INFORMATION PROCESSING APPARATUS AND METHOD AS WELL AS PROVIDING MEDIUM

(75) Inventor: Junji Ohwi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/481,199

(22) Filed: Jan. 11, 2000

(30) Foreign Application Priority Data

| Jan. 12, 1999 | (JP) | ............................................ 11-005431 |
| Feb. 12, 1999 | (JP) | ............................................ 11-034695 |

(51) Int. Cl.$^7$ ............................................. G06F 17/10
(52) U.S. Cl. ............................. 703/2; 703/22; 358/433; 358/444; 358/523; 358/75; 715/513
(58) Field of Search ............................. 715/513; 703/2, 703/22; 358/433, 444, 523, 75

(56) References Cited

U.S. PATENT DOCUMENTS

| 5,181,104 | A | * | 1/1993 | Sugishima et al. | ......... 358/500 |
| 5,260,804 | A | * | 11/1993 | Fukutomi et al. | ........... 358/444 |
| 5,287,204 | A | * | 2/1994 | Koizumi et al. | ............ 358/538 |
| 5,309,258 | A | * | 5/1994 | Kouno et al. | ............... 358/523 |
| 5,481,372 | A | * | 1/1996 | Kouno et al. | .......... 358/426.12 |
| 6,236,387 | B1 | * | 5/2001 | Imada | ........................ 715/513 |

OTHER PUBLICATIONS

"Digital Darkroom User's Manual" MicroFrontier Inc., Version 1.2, Copyright 1998.*
"Pavis User Manual" D. Dimian, Aug. 28, 1995.*
Softimage/Eddie A Comprehensive Users Guide Version 3.2, Softimage Inc., Copyright 1995.*
"Adobe Photoshop Users Guide", Version 2.5, Adobe System Inc., Apr. 1993.*
"Computer Graphics: Principles and Practice", J.D. Foley, Addison–Wesley Publishing, ISBN 0–201–84840–6, 1996.*
"Phase One Image Capture Software Reference Manual", Phase One Inc. Edition 3.1, Nov. 1997.*

* cited by examiner

Primary Examiner—Kevin J. Teska
Assistant Examiner—Fred Ferris
(74) Attorney, Agent, or Firm—Frommer Lawrence & Haug LLP; William S. Frommer; Dennis M. Smid

(57) ABSTRACT

An information processing apparatus which pleases a user with a higher degree of entertainment property is disclosed. A graphic chip copies original image data stored in a VRAM into a buffer built therein so that the original image data may be stored into the buffer. Further, the graphic chip reverses those of the original image data in replacement areas of the image horizontally leftwardly and rightwardly and stores the thus reversed image data into the buffer. The graphic chip thereupon performs α blending of the original image data and the reversed image data based on α values of a table.

14 Claims, 19 Drawing Sheets

F I G. 10
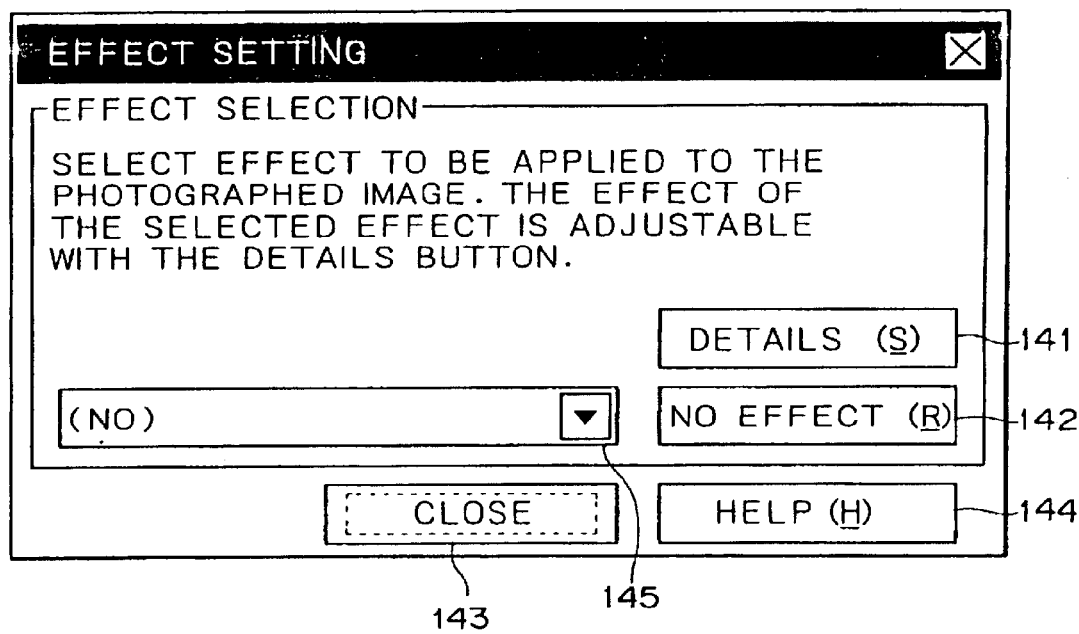

F I G. 15
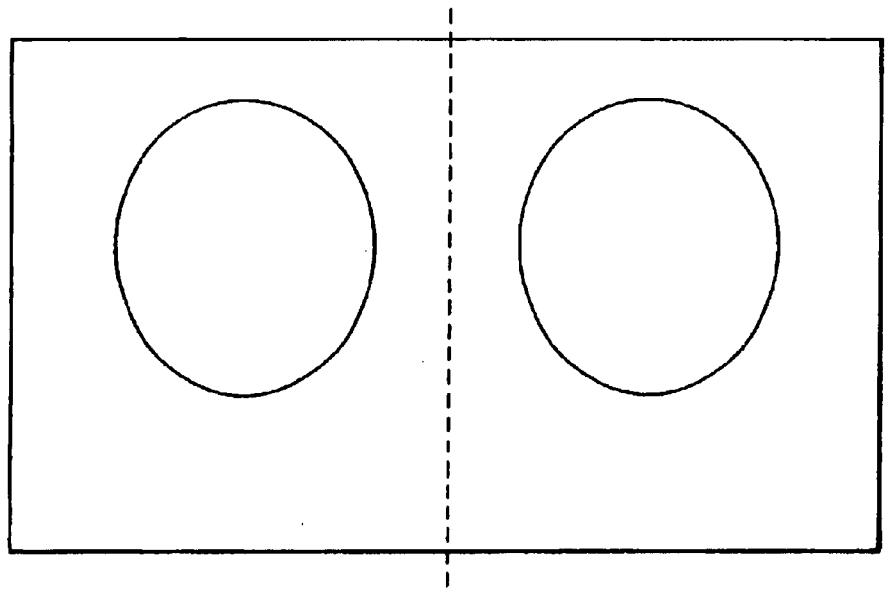
F I G. 16
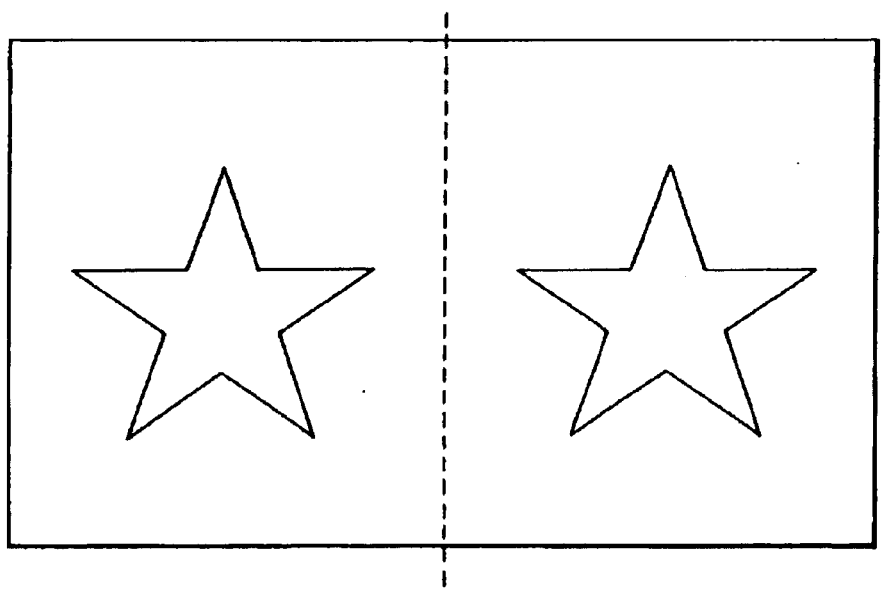

INFORMATION PROCESSING APPARATUS AND METHOD AS WELL AS PROVIDING MEDIUM

BACKGROUND OF THE INVENTION

This invention relates to an information processing apparatus and method as well as a providing medium, and more particularly to an information processing apparatus and method as well as a providing medium wherein an image is captured from a video camera and displayed with an effect applied thereto.

A portable personal computer in which a CCD (Charge Coupled Device) video camera is incorporated can pick up an image of an imaging object using the CCD video camera and display the produced image data on a liquid crystal display (LCD) unit so that the image data may be enjoyed by a user of the portable personal computer.

The conventional portable personal computer described above, however, picks up an image of an imaging object using the CCD camera and displays the thus produced image data as it is without processing the same. Therefore, the conventional portable personal computer has a subject to be solved in that it lacks in entertainment property of amusing the user.

SUMMARY OF THE INVENTION

It is an object of the present invention to provide an information processing apparatus which is high in entertainment property.

In order to attain the object described above, according to the present invention, as one of effects to be applied to image data produced by picking up an image of an imaging object, those of the image data which are in predetermined areas are replaced with each other to compose the image data, and the image data including the replaced image data are displayed.

More particularly, according to an aspect of the present invention, there is provided an information processing apparatus which composes an image, comprising image pick-up means for picking up an object image including two or more replacement areas disposed at position symmetrical with respect to an imaginary reference line, conversion means for converting the replacement areas into circles, calculation means for calculating a composition ratio, which varies non-linearly along an imaginary line perpendicular to a tangential line to the circles, for each position, composition ratio storage means for storing the composition ratios of individual pixels in the replacement areas corresponding to the individual positions, storage means for temporarily storing image data produced by the image pick-up means as original image data, production means for producing data of reversed images symmetrical with respect to the imaginary reference line based on the original image data stored in the storage means, composition means for composing the replacement areas on the original image and the replacement areas on the reversed image for the individual pixels based on the composition ratios, and display means for displaying the composite image data obtained by the composition means.

According to another aspect of the present invention, there is provided an information processing method for an information processing apparatus which composes an image, comprising an image pick-up step of picking up an object image including two or more replacement areas disposed at positions symmetrical with respect to an imaginary reference line, a conversion step of converting the replacement areas into circles, a calculation step of calculating a composition ratio, which varies non-linearly along an imaginary line perpendicular to a tangential line to the circles, for each position, a composition ratio storage step of storing the composition ratios of individual pixels in the replacement areas corresponding to the individual positions, a storage step of temporarily storing image data produced by the image pick-up step as original Image data, a production step of producing data of reversed images symmetrical with respect to the imaginary reference line based on the original image data stored by the storage step, a composition step of composing the replacement areas on the original image and the replacement areas on the reversed image for the individual pixels based on the composition ratios, and a display step of displaying the composite image data obtained by the composition step.

According to a yet further aspect of the present invention, there is provided a providing medium for providing a computer-readable program for causing an information Processing method, which composes an image, to execute processing comprising an image pick-up step of picking up an object image including two or more replacement areas disposed at positions symmetrical with respect to an imaginary reference line, a conversion step of converting the replacement areas into circles, a calculation step of calculating a composition ratio, which varies non-linearly along an imaginary line perpendicular to a tangential line to the circles, for each position, a composition ratio storage step of storing the composition ratios of individual pixels in the replacement areas corresponding to the individual positions, a storage step of temporarily storing image data produced by the image pick-up step as original image data, a production step of producing data of reversed images symmetrical with respect to the imaginary reference line based on the original image data stored by the storage step, a composition step of composing the replacement areas on the original image and the replacement areas on the reversed image for the individual pixels based on the composition ratios, and a display step of displaying the composite image data obtained by the composition step.

With the information processing apparatus, the information processing method and the providing medium, original image data and reversed image data are replace, with each other in replacement areas to compose a new image, and the composed image can please the user with a higher degree of entertainment property.

The above and other objects, features and advantages of the Present invention will become apparent from the following description and the appended claims, taken in conjunction with the accompanying drawings in which like part or elements denoted by like reference symbols.

BRIEF DESCRIPTION OF THE DRAWINGS

FIGS. 10 to 13 are schematic views showing a dialog box for effect setting displayed on the portable personal computer of FIG. 1;

FIGS. 15 and 16 are schematic views illustrating different examples of a shape of a replacement area displayed on the portable personal computer of FIG. 1;

DETAILED DESCRIPTION OF THE PREFERRED EMBODIMENT

Figure 1:
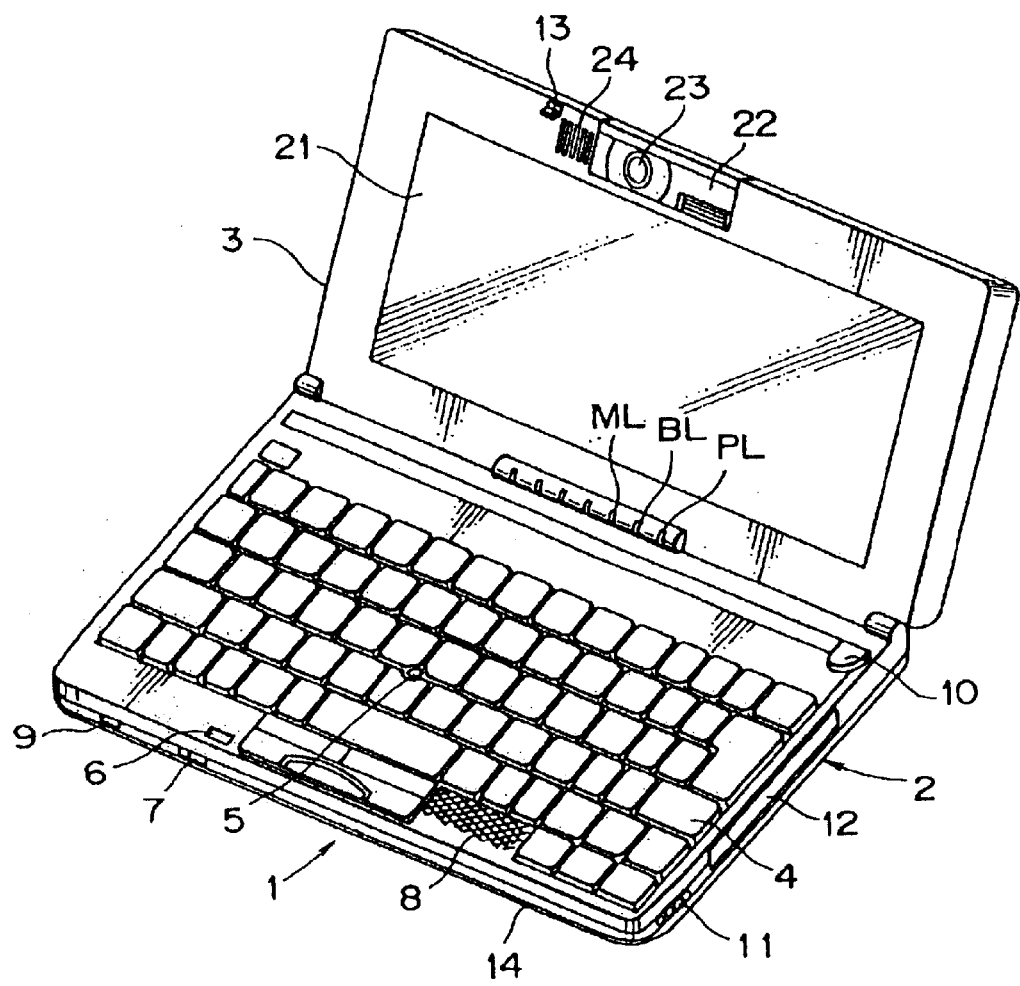
FIG. 1 is a perspective view of an example of a portable personal computer to which the present invention is applied showing an appearance of the portable personal computer when a display section is open with respect to a body.
Figure 2:
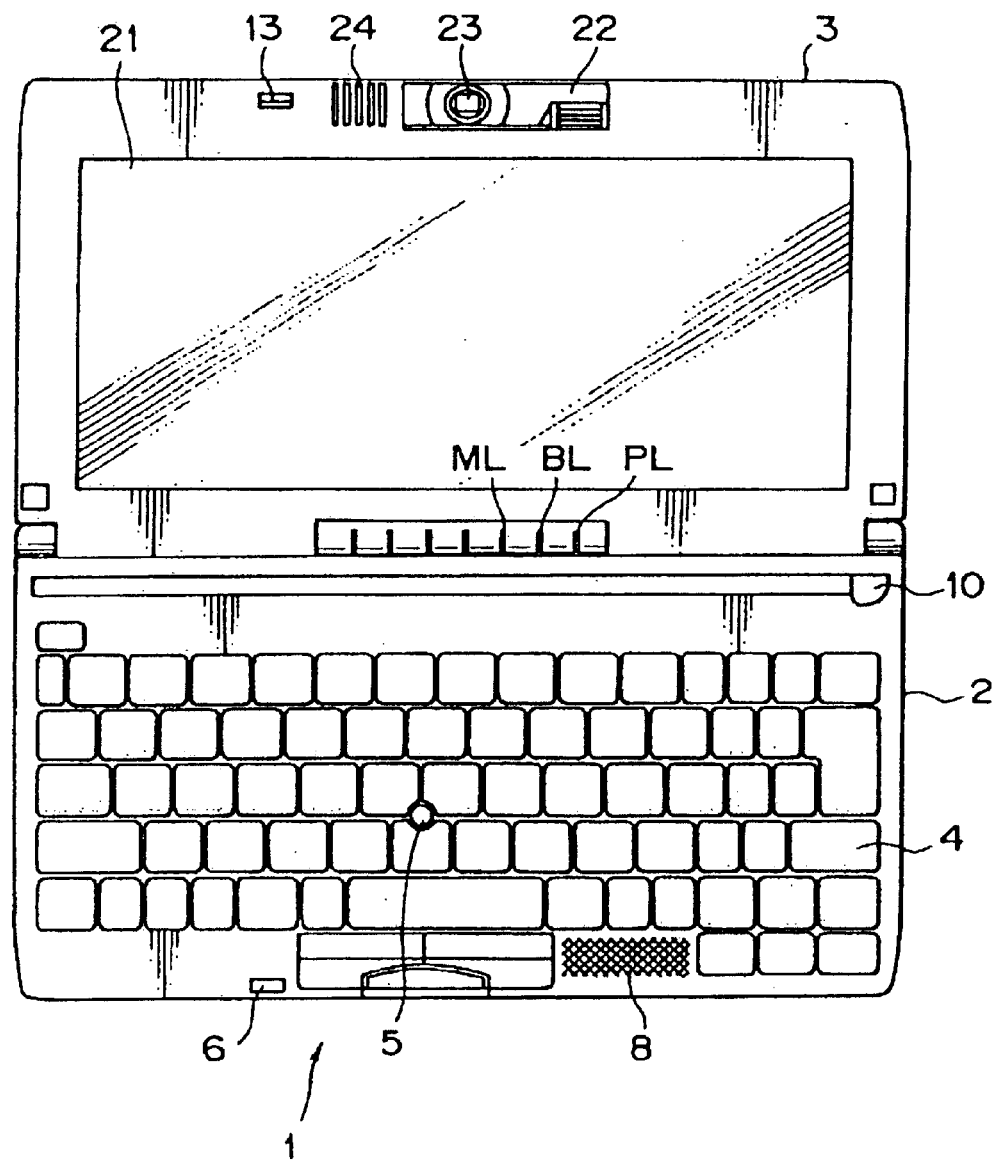
FIG. 2 is a plan view or the portable personal computer of FIG. 1.

Referring first to FIGS. 1 to 6, there is shown an example of a construction of a portable personal computer to which the present invention is applied. The portable personal computer shown is generally denoted at 1 and is formed as a personal computer of the mini notebook type which basically includes a body 2, and a display section 3 mounted for pivotal opening and closing movement with respect to the body 2. In FIG. 1 and 2, the display section 3 is open with respect to the body 2; in FIGS. 3 and 5, the display section 3 is closed with respect to the body 2; and in FIGS. 4 and 6, the display section 3 is open to 180 degrees with respect to the body 2.

A keyboard 4 which is operated in order to input various characters and symbols and a track point 5 (trademark) which is operated in order to move a mouse cursor are provided on an upper face of the body 2. Further, a speaker 8 for outputting sound and a shutter button 10 which is operated in order to pick up an image with a CCD video camera 23 provided on the display section 3 are provided on the upper face of the body 2.

Figure 3:
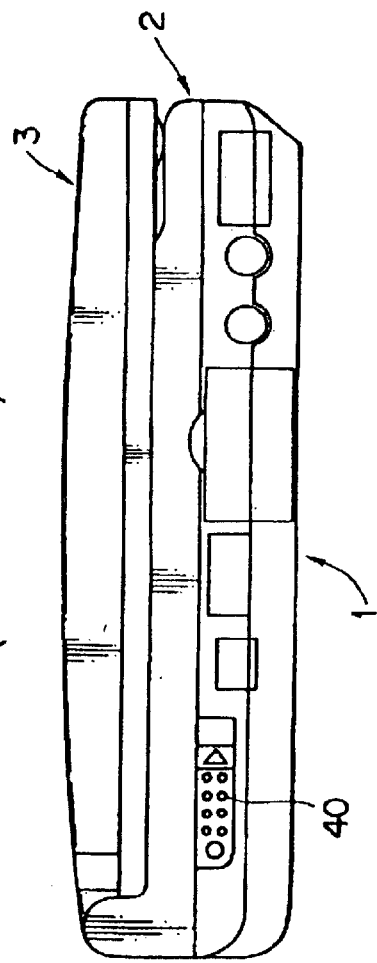
FIG. 3 is a left-hand side elevational view of the portable personal computer of FIG. 1 when the display section is closed with respect to the body.
Figure 6:
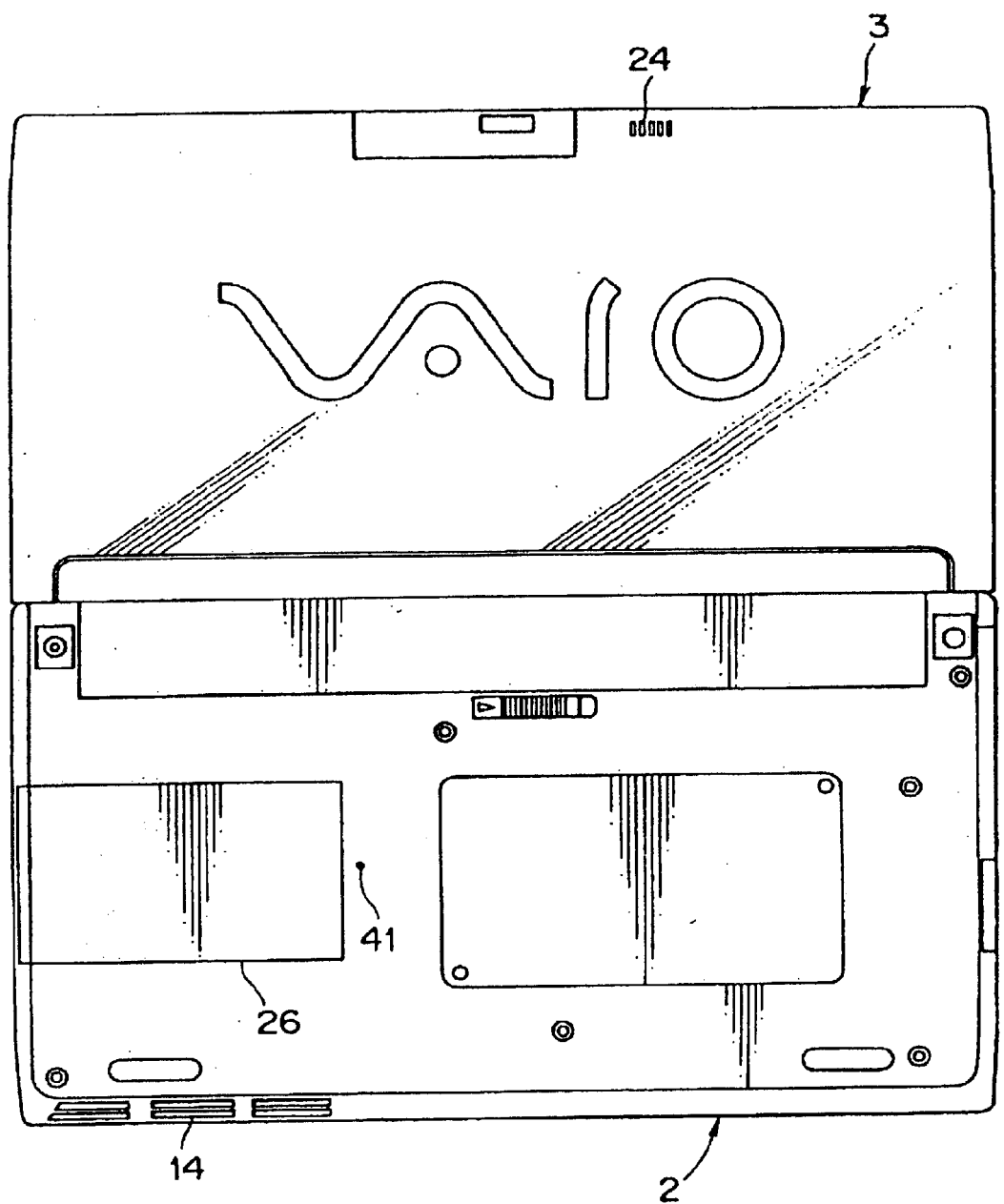
FIG. 6 is a bottom plan view of the portable personal computer of FIG. 1 when it is in the condition shown in FIG. 4.

A pawl 13 is provided at an upper end portion of the display section 3 while a hole 6 for receiving the pawl 13 is provided at a position of the body 2 which opposes the pawl 13 when the display section 3 is closed with respect to the body 2 as seen in FIG. 3. A slide lever 7 is mounted for parallel movement on a front face of the body 2 such that it engages with the pawl 13 fitted in the hole 6 to lock the pawl 13 or disengages from the pawl 13 to unlock the pawl 13. When the pawl 13 is unlocked from the slide lever 7, the display section 3 can be pivoted with respect to the body 2. A microphone 24 is mounted adjacent to the pawl 13 such that it can collect sound also from the rear face side of the display section 3 as seen in FIG. 6.

Figure 4:
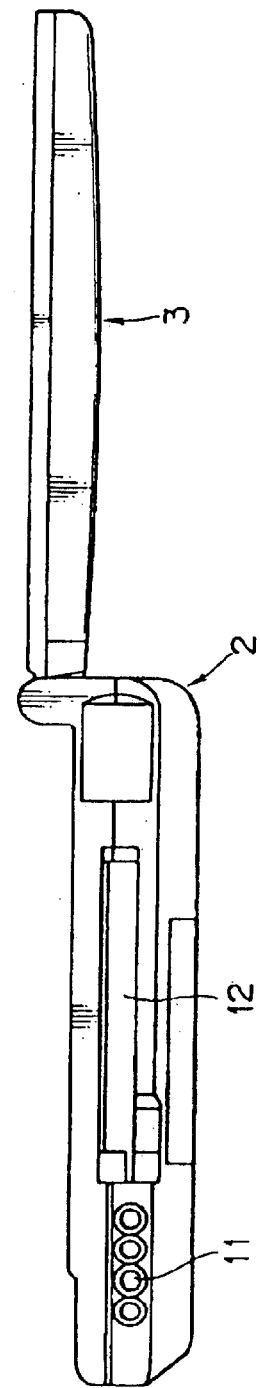
FIG. 4 is a right-hand side elevational view of the portable personal computer of FIG. 1 when the display section is open to 180 degree with respect to the body.
Figure 5:
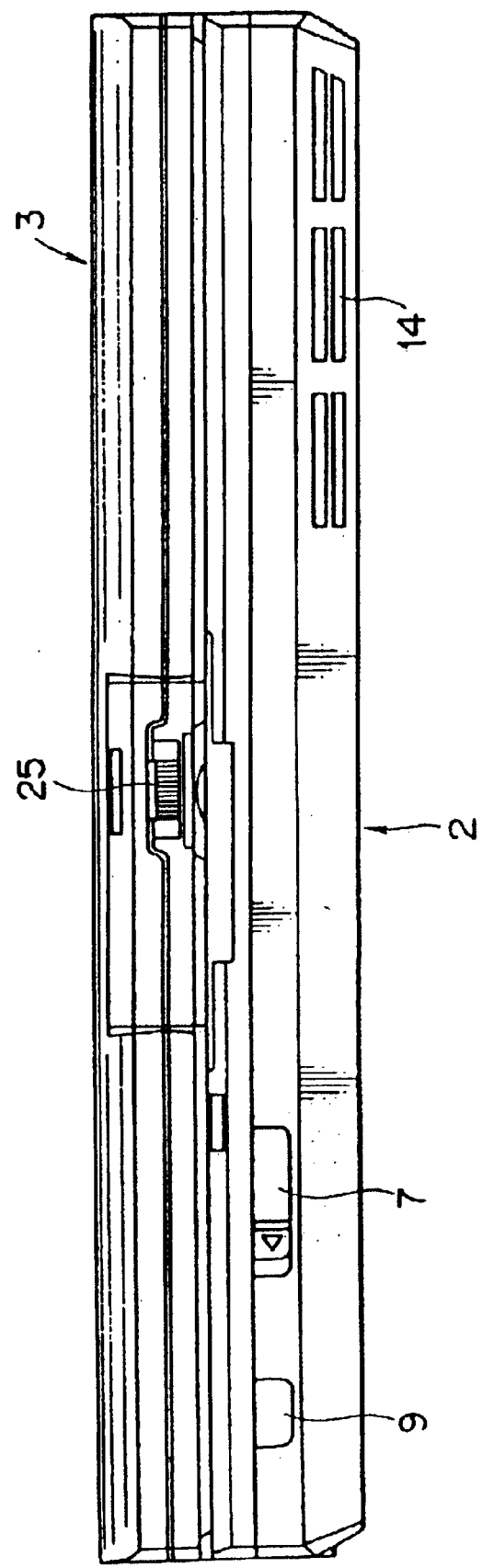
FIG. 5 is a front elevational view of the portable personal computer of FIG. 1 when it is in the condition shown in FIG. 3.

Also a programmable power key (PPK) 9 is provided on the front face of the body 2. An exhaust air hole 11 is formed in a right-hand side wall of the body 2 as seen in FIG. 4 while an inlet air hole 14 is provided at a lower portion of the front face of the body 2 as seen in FIG. 5. Further, a slot 12 for receiving a PCMCIA (Personal Computer Memory Card International Association) card (PC card) is formed on the right-hand side of the exhaust air hole 11.

A liquid crystal display (LCD) unit 21 for displaying an image thereon is provided on a front face of the display section 3, and an imaging section 22 is mounted for pivotal motion at an upper and portion of the display section 3. In particular, the imaging section 22 can be pivoted to an arbitrary position within a range of 180 degrees between a position at which it is directed in the same direction as the LCD unit 21 and another position in which it is directed in the opposite direction, that is, it is directed to the back of the LCD unit 21. The CCD video camera 23 is mounted on the imaging section 22.

A power supply lamp PL, a battery lamp BL, a message lamp ML and some other lamps each formed from a light emitting diode (LED) are provided at a lower portion of the display section 3 adjacent to the body 2. It is to be noted that reference numeral 40 in FIG. 3 denotes a power supply switch provided on the left-hand side wall of the body 2, and 25 in FIG. 5 denotes an adjustment ring for adjusting the focusing of the CCD video camera 23. Further, reference numeral 26 in FIG. 6 denotes a lid for covering over an opening through which a memory for additional installation is to be installed, and 41 denotes a small hole into which a pin for disengaging a lock pawl of a lid 26.

Figure 7:
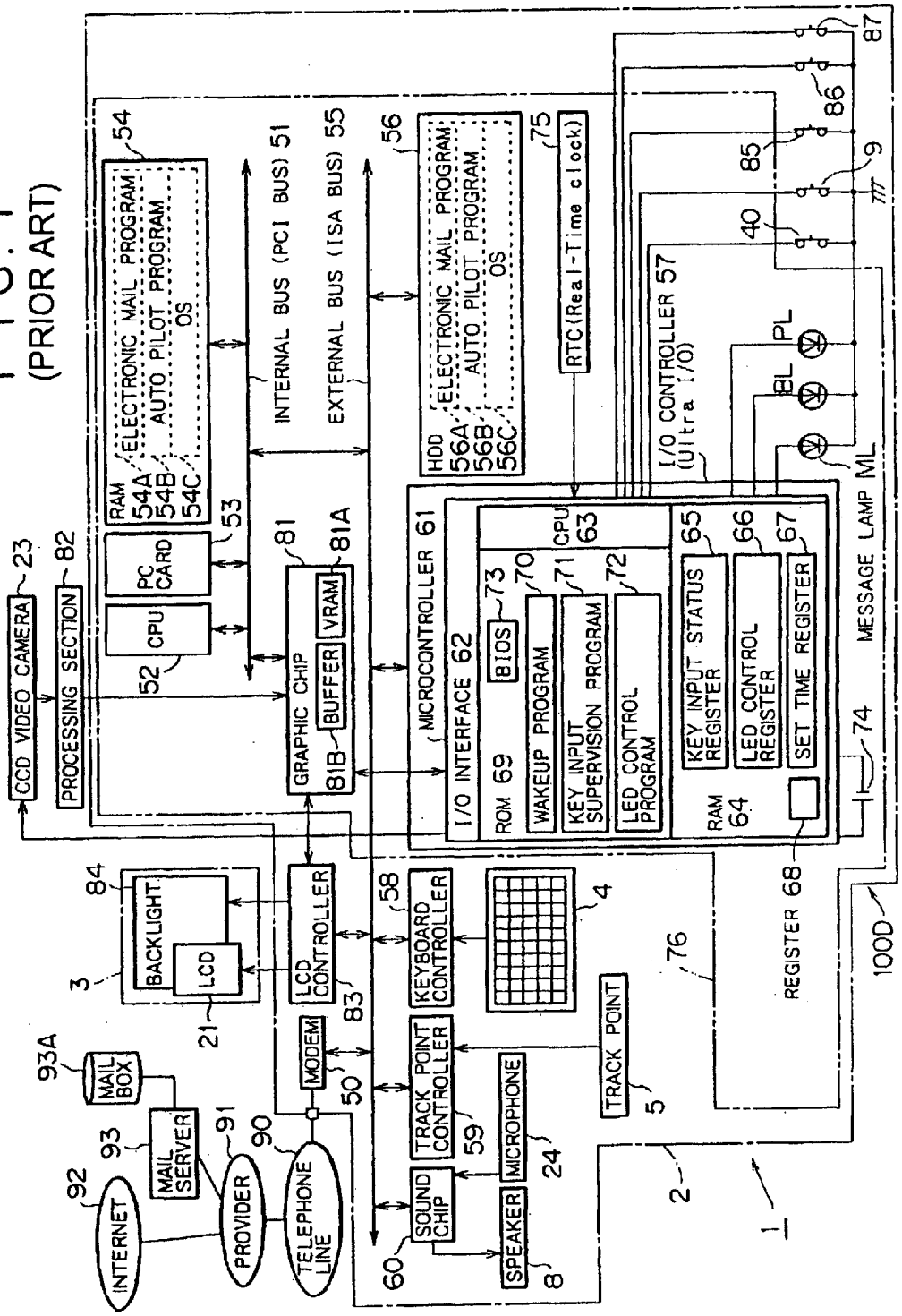
FIG. 7 is a block diagram showing an example of a construction of an electric circuit of the portable personal computer of FIG. 1.

FIG. 7 shows an internal construction of the personal computer 1. Referring to FIG. 7, a central processing unit (CPU) 52, a PC card 53 which is inserted into the slot 12 of the body 2 when necessary, a random access memory (RAM) 54 and a graphic chip 81 are connected to an internal (PCI (Peripheral Component Instrument)) bus 51. The internal bus 51 is connected to an external (ISA (Industrial Standard Architecture)) bus 55. A hard disc drive (HDD) 56, an I/O (input/output) controller 57, a keyboard controller 58, a track point controller 59, a sound chip 60, a LCD controller 83, a modem 50 and so forth are connected to the external bus 55.

The CPU 52 is a controller for controlling various functions of the personal computer 1. The PC card 53 is suitably loaded when it is desired to add an optional function.

Upon starting up of the personal computer 1, an electronic mail program (application program) 54A, an auto pilot program (application program) 54B and an OS (operating system: basic program) 54C are transferred to and stored into the RAM 54 from the HDD 56.

The electronic mail program 54A is a program for communicating a communication sentence with a communication circuit such as a telephone circuit over a network. The electronic mail program 54A has a terminating mail acquisition function as a particular function. The terminating mail acquisition function executes processing of inquiring a mail server 93 for whether or not a terminating mail destined for a user of the personal computer 1 is in a mail box 93A for the user and acquiring, if a mail destined for the user is present, the mail.

The auto pilot program 54B is a program for successively starting up a plurality of processes (or programs) set in advance in an order set in advance to perform necessary processing.

The OS (basic program software) 54C controls basic operation of the computer and is represented by the Windows95 (trademark)

An electronic mail program 56A, an auto pilot program 56B and an OS (basic program software) 56C are stored in the hard disc drive (HDD) 56 of the external bus 55 side. The OS 56C, the auto pilot program 56B and the electronic mail program 56A in the hard disc drive 56 are successively transferred to and stored into the RAM 54 in a startup (boot-up) process of the personal computer 1.

The I/O controller 57 includes a microcontroller 61, in which an I/O interface 62 is provided. The microcontroller 61 includes the I/O interface 62, a CPU 63, a RAM 64 and a ROM 69 connected mutually to each other. The RAM 64 has a key input status register 65, a LED (light emitting diode) control register 66, a set time register 67 and a register 68. The set time register 67 is used to start operation of a startup sequence control section 76 when a point of time (startup requirement) set in advance by a user comes. The register 68 stores a corresponding relationship between a combination (startup requirement) of operation keys set in advance and an application program to be started up. If the combination of operation keys stored in the register 68 is inputted by the user, then the application program (for example, the electronic mail) stored in the register 68 is started up.

The key input status register 65 stores an operation key flag if the programmable power key (PPK) 9 for a single touch operation is depressed. A LED control register 66 is used to control lighting of the message lamp ML which indicates a started up condition of the application program (electronic mail) stored in the register 68. The set time register 67 is used to arbitrarily set a required point of time.

A backup battery 74 is connected to the microcontroller 61 so that the values stored in the registers 65. 66 and 67 may be maintained even if power supply to the body 2 is disconnected.

A wakeup program 70, a key input supervision program 71 and a LED control program 72 are stored in advance in the ROM 69 in the microcontroller 61. The ROM 69 is formed from, for example, an EEPROM (electrically erasable and programmable read only memory). The EEPROM is also called flash memory. Further, a RTC (Real-Time Clock) 75 for normally counting the current time is connected to the microcontroller 61.

The wakeup program 70 in the ROM 69 checks based on the current time data supplied from the RTC 75 whether or not a point of time set in advance in the set time register 67 comes and starts up, if the preset time comes, a predetermined process (or program). The key input supervision program 71 normally supervises whether or not the programmable power key 9 is depressed by the user. The LED control program 72 is a program for controlling lighting of the message lamp ML.

Further, a BIOS (Basic Input/Output System) 73 is written in the ROM 69. The BIOS is a basic input/output system and is a software program for controlling communication (inputting/outputting) of data between the OS or an application software and a peripheral equipment (a display unit, a keyboard, a hard disc drive or the like).

The keyboard controller 58 connected to the external bus 55 controls inputting from the keyboard 4. The track point controller 59 controls inputting from the track point 5.

The sound chip 60 fetches an input from the microphone 24 or supplies an audio signal to the built-in speaker 8.

The modem 50 can be connected to a communication network 92 such as the Internet or the mail server 93 through a public telephone line 90 or an Internet service provider 91.

To the graphic chip 81 connected to the internal bus 51, image data fetched by the CCD video camera 23 and processed by a processing section 82 are inputted. The graphic chip 81 stores the image data inputted from the CCD video camera 23 through the processing section 82 into a VRAM 81A built therein and suitably reads out and outputs the image data to the LCD controller 83. The graphic chip 81 has a buffer 81B built therein. The LCD controller 83 outputs the image data supplied thereto from the graphic chip 81 to the LCD unit 21 so that the image data may be displayed on the LCD unit 21. A backlight 84 illuminates the LCD unit 21 from the back thereof.

A power supply switch 40 is operated in order to turn the power supply on or off. A half depression switch 85 is turned on when the shutter button 10 is depressed to a half-depressed position, and a full depression switch 86 is turned on when the shutter button 10 is depressed fully. A reverse switch 87 is switched on when the imaging section 22 in pivoted by 180 degrees (when the CCD video camera 23 is turned to a direction in which it images the rear of the LCD unit 21).

Subsequently, processing operation of the personal computer 1 when an image is picked up by the CCD video camera 23 and portions (the faces of two persons) of image data thus produced in two replacement areas set to predetermined positions are replaced to produce a composite image (race change) will be described with reference to a flow chart of FIG. 8.

First in step S1, the user will operate the keyboard 4 or the track point 5 to instruct the CPU 52 to start up a smart capture which is an application program to perform face change processing. In particular, when the user inputs an instruction to start up the smart capture program, then the CPU 52 reads out the smart capture program stored in advance in the HDD 56 and transfers the thus read out smart capture program to the RAM 54 over the external bus 55 and the internal bus 51 so that the smart capture program is stored into the RAM 54. The CPU 52 reads out the smart capture program from the RAM 54 over the internal bus 51 and executes the smart capture program.

Figure 9:
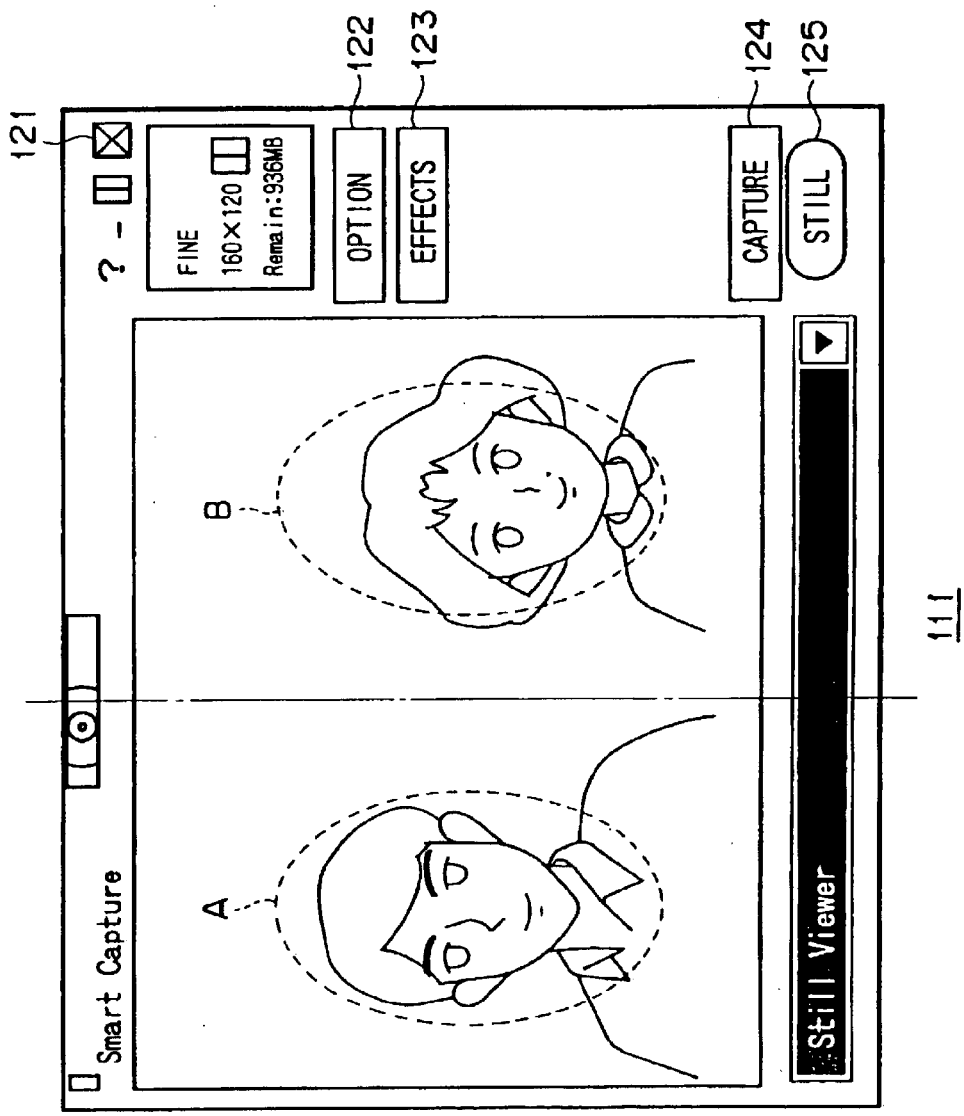
FIG. 9 is a schematic view showing a GUI screen of smart capture of the portable personal computer of FIG. 1.

Thereupon, the CPU 52 controls the LCD unit 21 to display such a GUI (Graphical User Interface) screen 111 of the smart capture as shown in FIG. 9, in this stage, no person is displayed on the LCD unit 21. "Still Viewer" on the GUI screen 111 indicates that the image displayed on the LCD unit 21 is a window for displaying a picked-up still picture. An end button 121 is operated in order to end the smart capture. An option button 122 is operated in order to very the size of the screen or to perform panorama assist picking up images. An effects button 123 is operated in order to set an effect to be applied to a picked-up image. A capture button 124 is operated in order to insert a still picture into a document. A still button 125 is operated in order to pick up an image.

In step S2, the image data (the faces of the two persons) fetched by the CCD video camera 23 are processed by the processing section 82 and supplied to the graphic chip 81. The graphic chip 81 stores the image data supplied thereto into the VRAM 81A built therein and reads out and supplies the stored image data from the VRAM 81A to the LCD controller 83. The LCD controller 83 outputs the image data supplied thereto from the graphic chip 81 to the LCD unit 21 so that the image data may be displayed on the GUI screen 111 of the smart capture of the LCD unit 21 (FIG. 9).

In step S3, if the user operates the track point 5 to click the effects button 123 of the GUI screen 111, then the CPU 52 controls the LCD unit 21 to display such a dialog box 131 for effect setting as shown in FIG. 10.

An effect to be applied to a picked-up image can be selected on the dialog box 131. A details button 141 is operated in order to adjust the efficacy of the selected effect. A no effect button 142 is operated when there is no effect to be applied to a picked-up image. A close button 143 is operated in order to close the dialog box 131. A help button 144 is operated when it is not known what operation should be performed.

Figure 11:
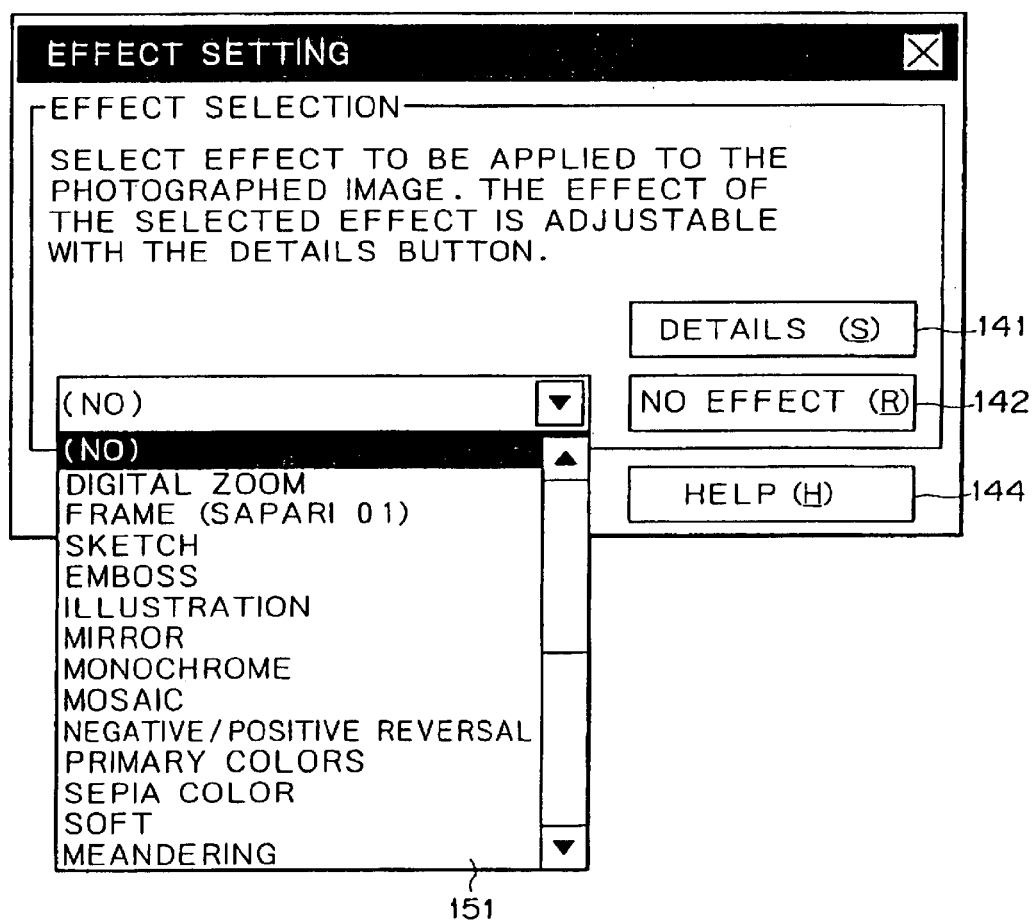
Figure 12:
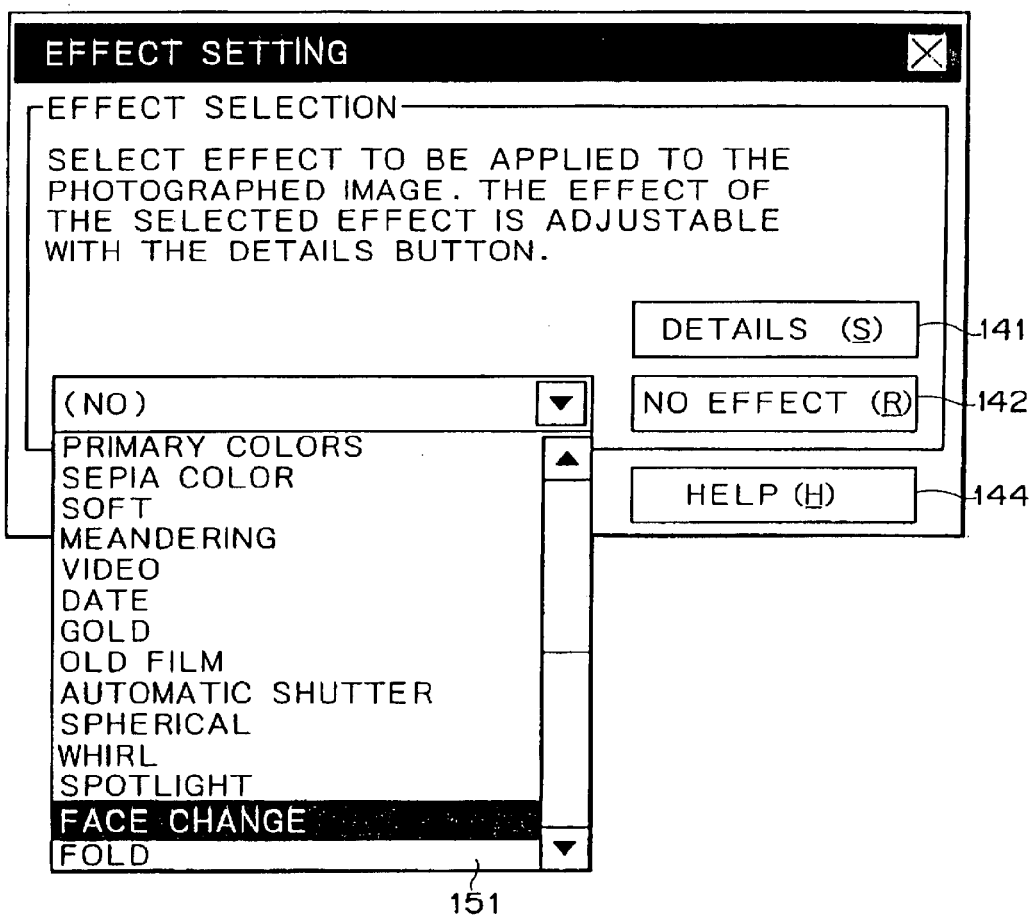

If the user operates the track point 5 to click a button 145, then the CPU 52 controls the LCD unit 21 to display a dropdown list 151 (FIG. 11) for selection of an effect. If the user moves the cursor and click the face change from within the dropdown list 151 (FIG. 12), then the characters "Face change" appear on the left-hand side of the button 145 (FIG. 13).

Figure 13:
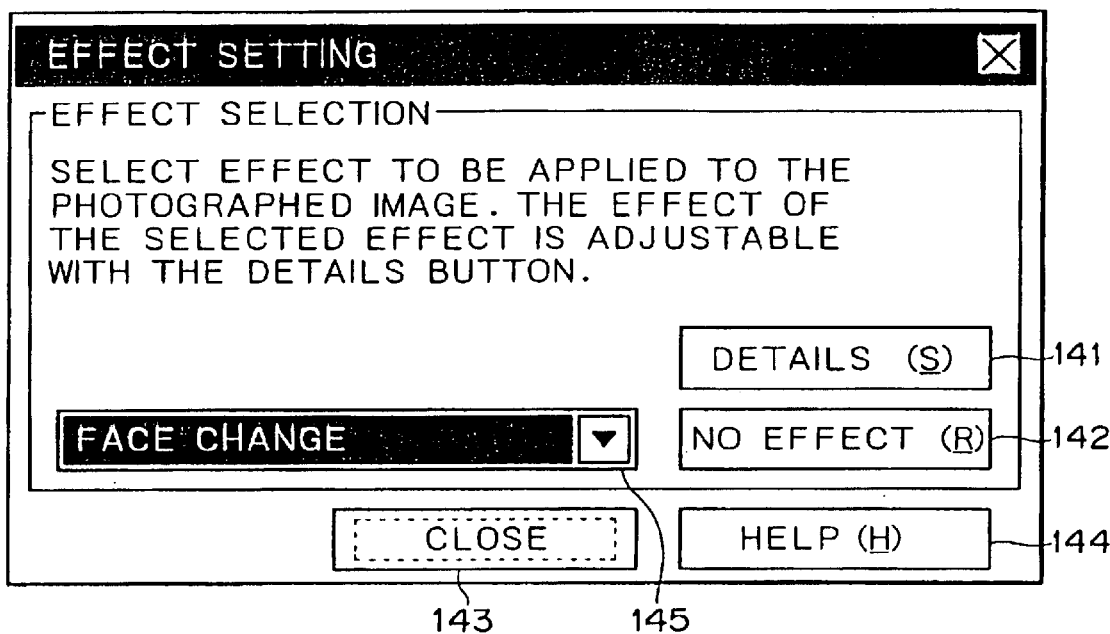
Figure 14:
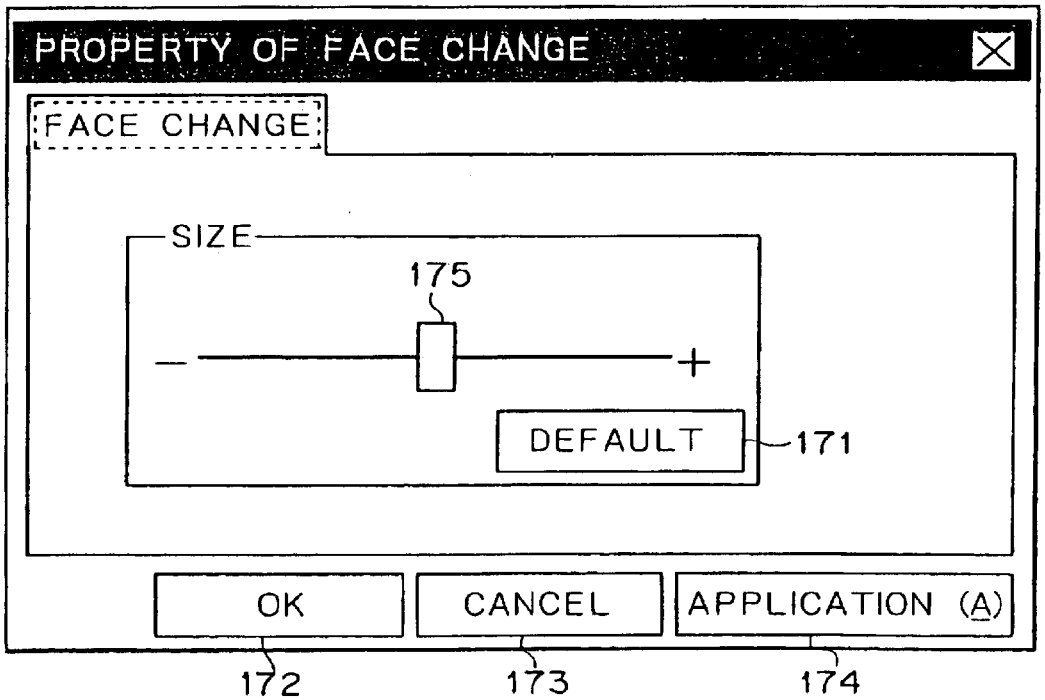
FIG. 14 is a schematic view showing a dialog box for changing the size of an elliptical area displayed on the portable personal computer of FIG. 1.

If the user clicks the details button 141 in the condition of FIG. 13, then the CPU 52 controls the LCD unit 21 to display such a dialog box 161 as shown in FIG. 14. On the dialog box 161, the size (magnitude) of elliptical areas A and B (FIG. 9), for a face change can be adjusted by moving a button 175 leftwardly or rightwardly. A default button 171 is operated in order to set the size of the elliptical areas A and B to a default value. An OK button 172 is operated in order to accept a set size. A cancel button 173 is operated in order to cancel a set size. An application button 174 is operated in order to apply a set size.

Figure 17:
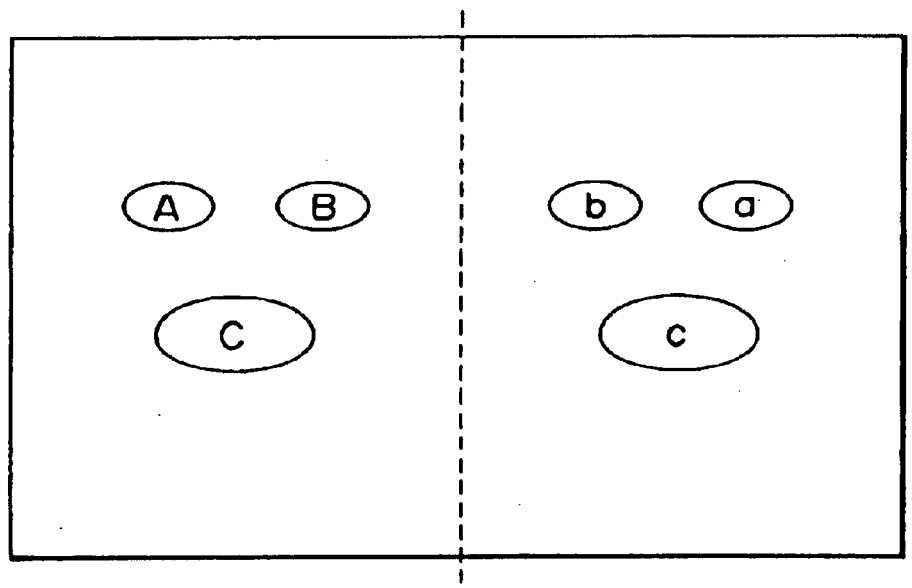
FIGS. 17 and 18 are schematic views illustrating different replacement areas displayed on the portable personal computer of FIG. 1.
Figure 18:
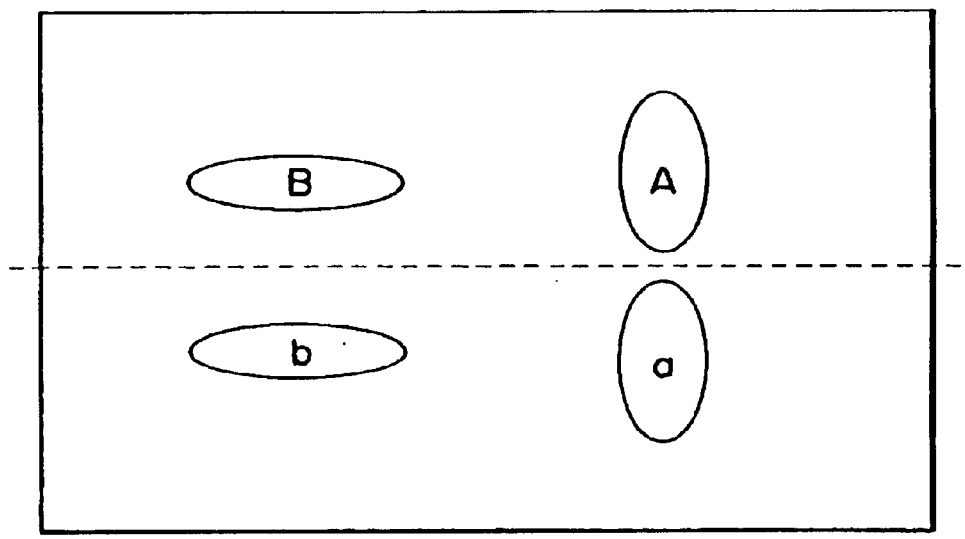

It is to be noted that, while, on the dialog box 161 of FIG. 14, the size of two elliptical areas which are symmetrical with respect to the center line of the picked-up image, around which a picked-up image is divided equally to the left and right, is adjusted as seen in FIG. 15, naturally the shape of such replacement areas is not limited to the elliptical shape. For example, the replacement areas may be star-shaped areas as shown in FIG. 16. Further, the number of replacement areas is not limited to two, but may be set freely to two or more. For example, in FIG. 17, six elliptical areas which are symmetrical with respect to the center line which divides a picked-up image equally horizontally to the left and right. In this instance, however, the ratios of the corresponding six elliptical areas are set equal among them. Further, replacement areas may be set such that, as shown in FIG. 18, they are symmetrical with respect to a horizontal center line which divides a picked-up area equally to the upper and lower halves.

Referring back again to FIG. 8, in step S4 the CPU 52 performs preparation processing for the effect (face change) selected in step S3. In the effect preparation processing, the CPU 52 calculates a ratio α at which, for each pixel (picture element) of the image data fetched by the CCD video camera 23, the color at a designated position and the original color should be mixed.

Figure 19:
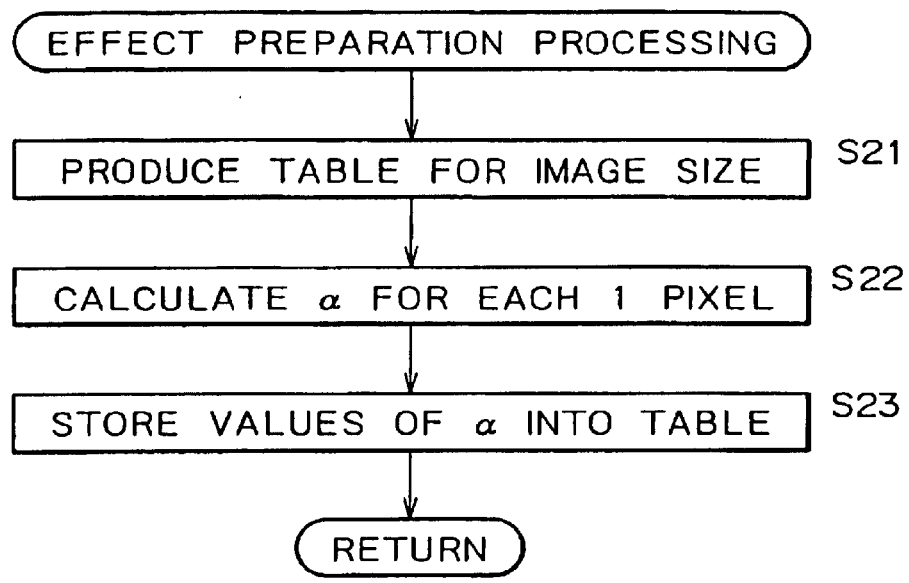
FIG. 19 is a flow chart illustrating details of effect preparation processing in the flow chart of FIG. 8.

The effect preparation processing is described in more detail with reference to a flow chart of FIG. 19.

In step S21, the CPU 52 produces a table of a size corresponding to the size of an image to be fetched by the CCD video camera 23 and stores the table into the RAM 54. It is to be noted that the table corresponds to the pixels.

Figure 20A:
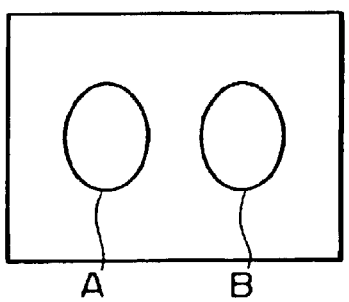
FIGS. 20A and 20B are schematic views illustrating an arithmetic method used in the operation of the flow chart of FIG. 8.
Figure 20B:
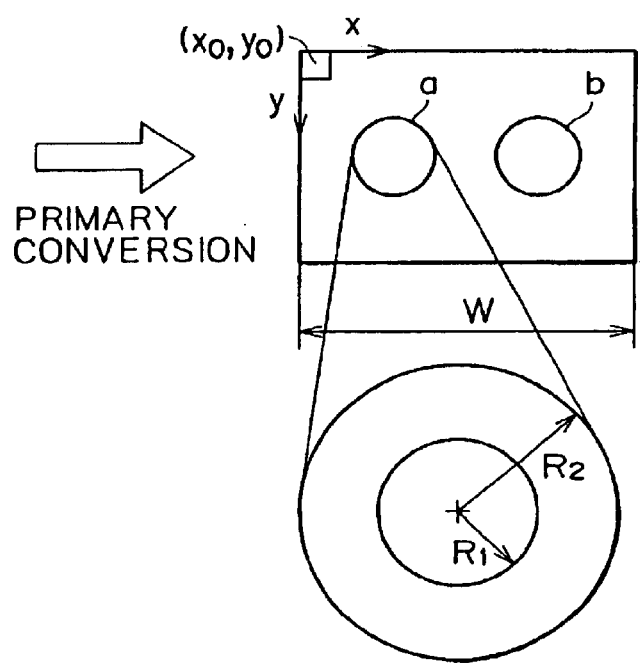

In step S22, the CPU 52 calculates the value of a corresponding to each of the pixels of the image data to be fetched by the CCD video camera 23. Here, a method of calculating the value of a of each pixel is described with reference to FIG. 20. First, the CPU 52 performs primary conversion of coordinates so that two elliptical areas A and B (FIG. 20A) are changed into circles a and b (FIG. 20B), respectively. Where, in FIG. 20B, the horizontal magnitude or width of the image to be fetched is represented by W, the distance between a pixel at an arbitrary position $(x_0, y_0)$ and the center of the circle a (or b) is represented by r, and the radii of two concentric circles are represented by $R_1$ and $R_2$ ($R_1$ and $R_2$ are arbitrary values), the value of α of the pixel is presented by the following expressions (1) to (3):

when $r<R_1$ (when the pixel is within the elliptical area), $$\alpha=1 \qquad (1)$$

when $R_1 \leq r<R_2$ (when the pixel is in the proximity of the boundary of the elliptical area), $$\alpha=(\cos<(r-R_1)\times\pi/(R_2-R_1))+1)/2 \qquad (2)$$

when $R_2<r$ (when the pixel is outside the elliptical area), $$\alpha=0 \qquad (3)$$

Referring back to FIG. 8 yet again, in step S23, the CPU 52 performs inverse primary conversion of the coordinates of the values of α of the individual pixels calculated in accordance with the expressions (1) to (3) so that the two circles a and b may be the elliptical areas A and B, respectively. Then, the CPU 52 stores resulting values of the inverse primary conversion into the table of the RAM 54, thereby ending the effect preparation processing.

Referring back to FIG. 8, in step S5, the CPU 52 discriminates whether or not the end button 121 (FIG. 9) is clicked. If it is discriminated in step S5 that the end button 121 is clicked, then the processing operation is ended.

If it is discriminated in step S5 that the end button 121 is not clicked, then the control of the CPU 52 advances to step 56, in which the CPU 52 controls the CCD video camera 23 to fetch image data. The image data fetched by the CCD video camera 23 are processed by the processing section 82 and then supplied to the graphic chip 81. The graphic chip 81 stores the image data supplied thereto into the VRAM 81A built therein.

Figure 21:
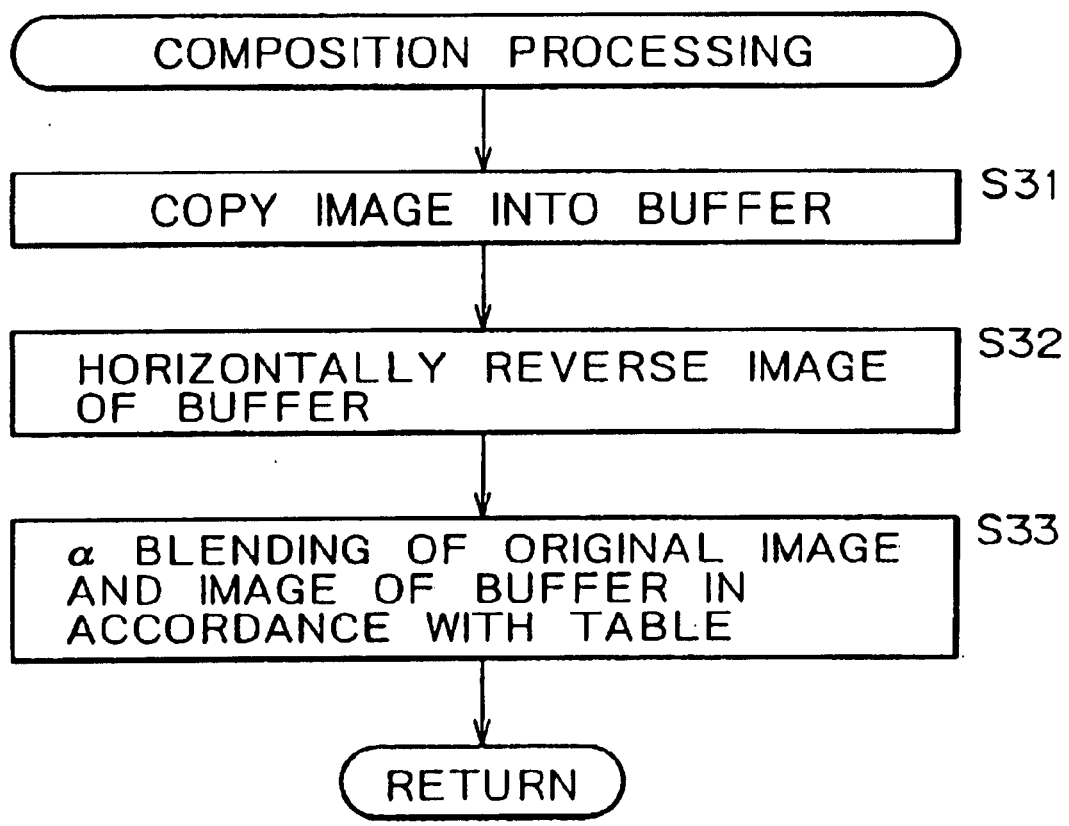
FIG. 21 is a flow chart illustrating details of composition processing in the operation of the flow chart of FIG. 8.

In step S7, the graphic chip 81 performs composition processing. The composition processing in step S7 is described more particularly with reference to a flow chart of FIG. 21.

In step S31, the graphic chip 81 copies the image data (original image) stored in the VRAM 81A into the buffer 81B built therein so that the image data are stored into the buffer 81B.

In step S32, the graphic chip 81 replaces the stored positions of the image data stored in the buffer 81B such that the following expressions (4) and (5) may be satisfied:

$$x_1=W-x_0 \qquad (4)$$

$$y_1=y_0 \qquad (5)$$

where $(x_0, y_0)$ and $(x_1, y_1)$ represent the positions of the two pixels to be replaced with each other.

Consequently, a leftwardly and rightwardly or horizontally reversed image as is seen when the image stored in the VRAM 81A is observed through a mirror is stored into the buffer 81B.

In step S33, the graphic chip 81 performs α blending of the original image data stored in the VRAM 81A (the image picked up by the CCD video camera 23) and the reversed image data stored in the buffer 81B based on the values of α of the table stored in the RAM 54. In particular, where the original color of a pixel stored in the VRAM 81A is represented by $C_0$ and the color at the corresponding position on the buffer 81B is represented by $C_1$, the composite color C to be outputted is calculated in accordance with the following expression:

$$C=(1-\alpha) \times C_0 + \alpha C_1 \qquad (6)$$

It is to be noted that, in the YUV space, the colors $C_0$, $C_1$ and C are given by $C_0=(Y_0, U_0, V_0)$, $C_1=(Y_1, U_1, V_1)$ and $C=(Y, U, V)$.

When $r<R_1$ (when the pixel is in the elliptical area), since α=1 from the expression (1) above, the composite color C to be outputted is the color $C_1$ of the pixel on the buffer 81B. When $R_1 \leq r < R_2$ (when the pixel is in the proximity of the boundary of the elliptical area), since $\alpha=(\cos((r-R_1)\times\pi/(R_2-R_1))+1)/2$ from the expression (2) above, the composite color C to be outputted gradually varies in the proximity of the boundary of the ellipsis. Accordingly, a composite image which does not provide an unfamiliar feeling is obtained. When $R_2 < r$ (when the pixel is outside the elliptical area), since α0 from the expression (3), the composite color C to be outputted is the original color $C_0$ of the pixel on the VRAM 81A.

It is to be noted that, when $R_2 < r$ (when the pixel is outside the elliptical area) in the expression (6) above, α=0 and, it α=0 is not satisfied for all of the pixels in the elliptical area, then the value of α ($0 < \alpha \leq 1$) may be varied for each pixel. Further, when $r<R_1$ in the expression (6) (when the pixel is in the elliptical area), composition may be performed with α=1 while no calculation is performed for the area outside the elliptical area.

Figure 8:
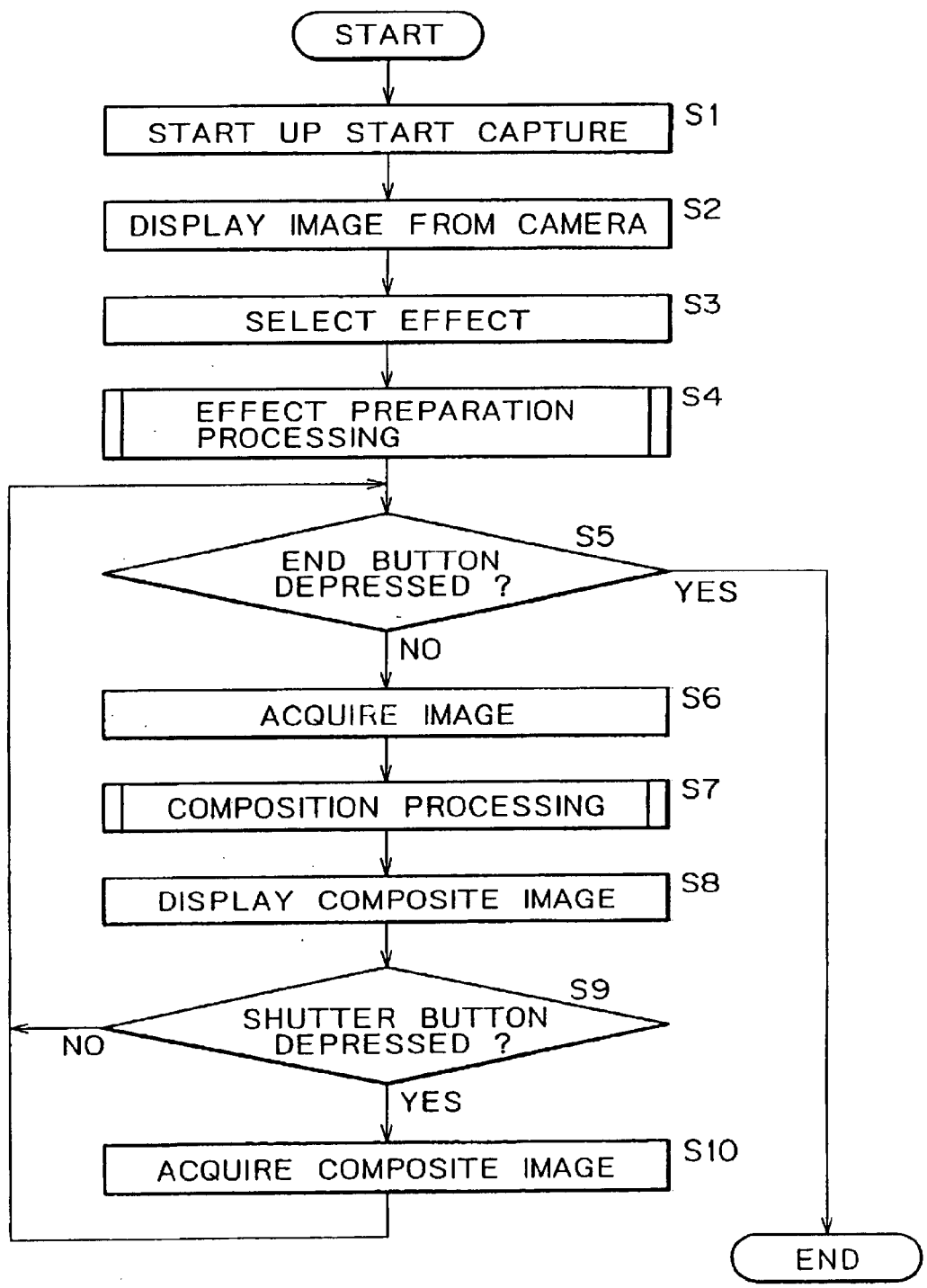
FIG. 8 is a flow chart illustrating processing operation of the portable computer of FIG. 1 when a face change operation is performed.
Figure 22:
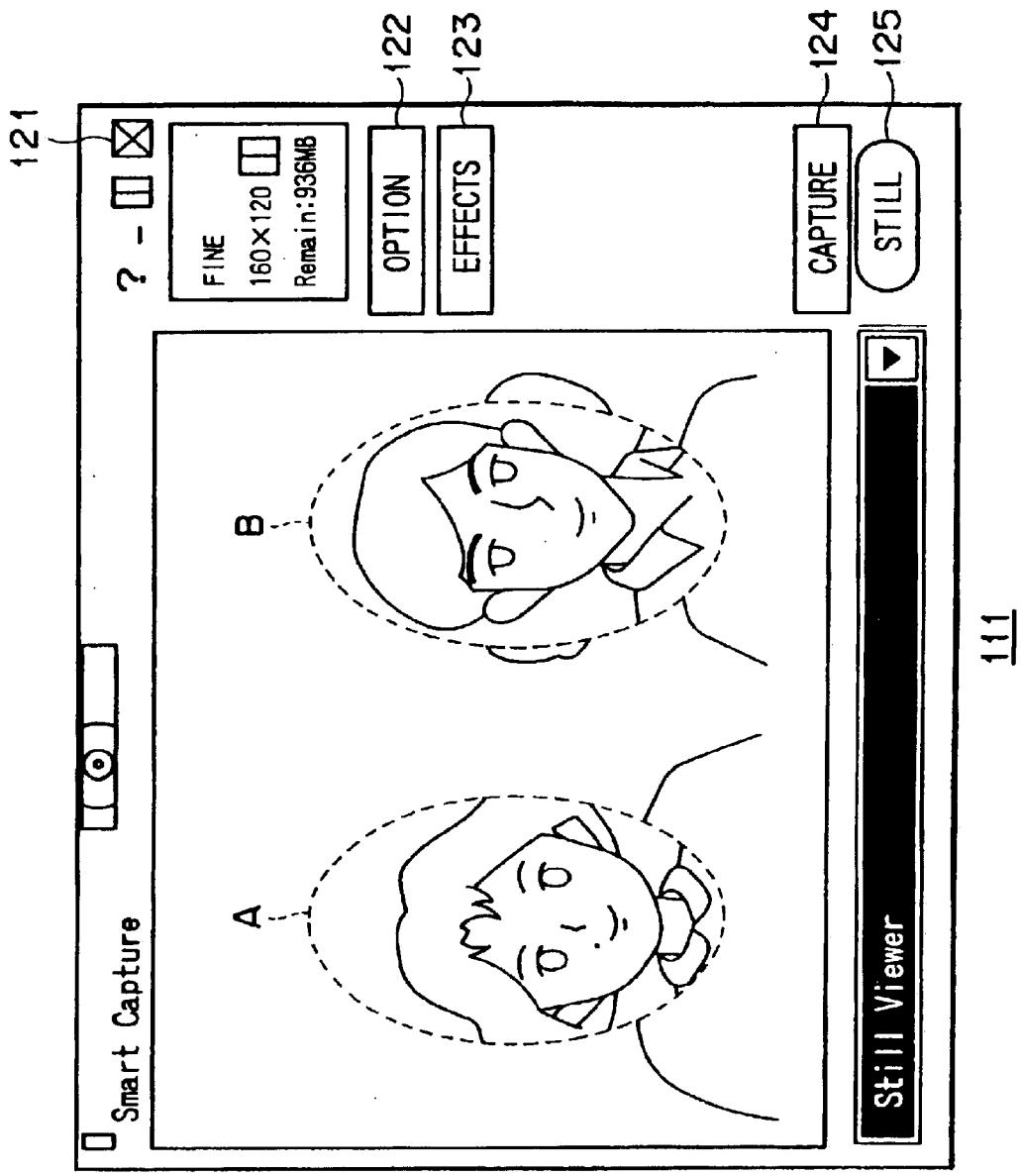
FIG. 22 is a schematic view showing a GUI screen after a face change is executed by the portable personal computer of FIG. 1.
Figure 23:
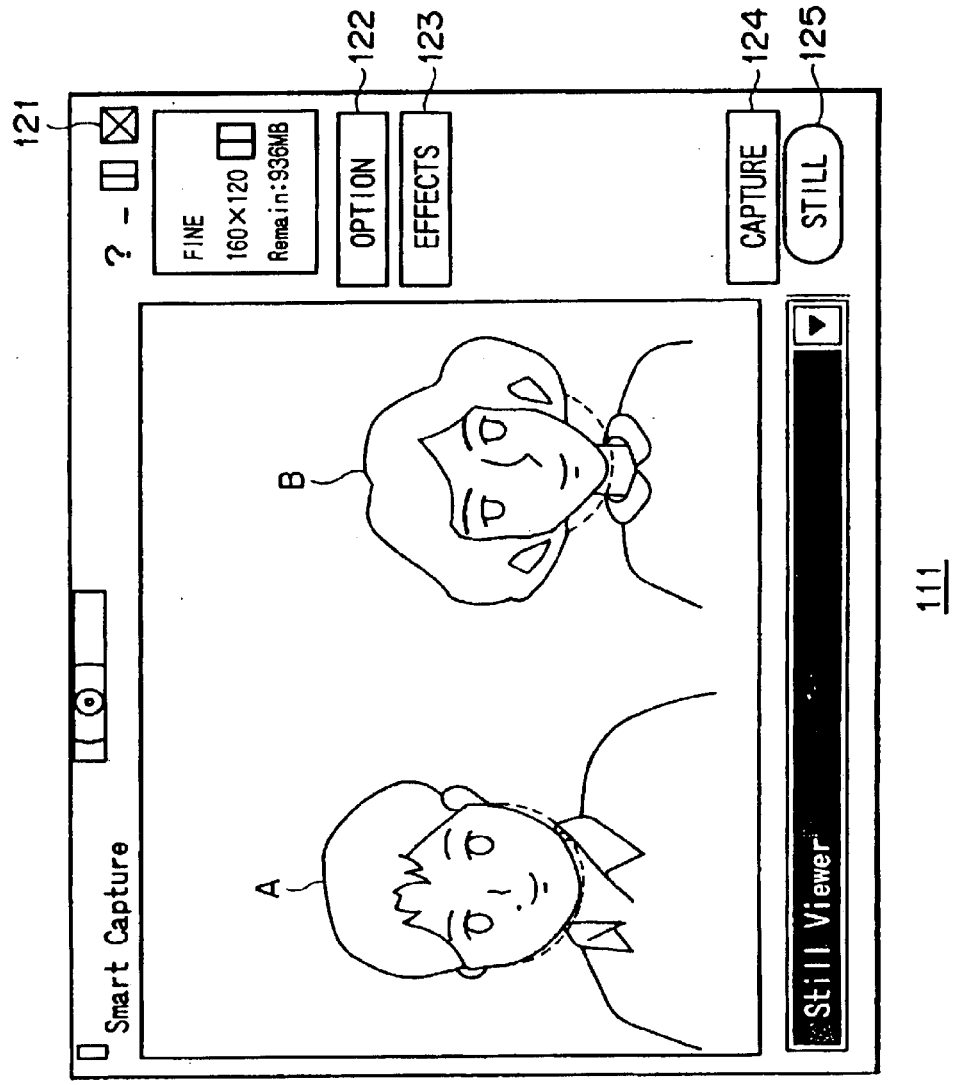
FIG. 23 is a schematic view showing a GUI screen after a face change is executed with the size of elliptical areas varied by the portable personal computer of FIG. 1.

Referring back yet again to the flow chart of FIG. 8, in step S8, the image data (composite image data) composed by the graphic chip 81 are supplied to the LCD controller 83, and the LCD controller 83 controls the LCD unit 21 so that the composite image data supplied may be displayed on the LCD unit 21. Consequently, an image wherein the images of the two faces positioned in the two elliptical areas A and B are replaced with each other from those shown in FIG. 9 is obtained as seen in FIG. 22. It can be seen from the position or a mole of a woman in the elliptical area A and the direction of the nose of a man in the elliptical area B in FIG. 22 that the image shown is a mirror image. Also it can be seen that, since the color of the hair of the woman remains a little in the proximity of the boundary of the elliptical area B because all of the hair does not fit in the elliptical area B. Further, it is also possible to reduce the size of the elliptical areas and replace only the races of the two persons with each other as seen in FIG. 23.

In step S9, the CPU 52 discriminates whether or not the shutter button 10 (FIG. 1) is depressed. If it is discriminated in step S9 that the shutter button 10 is not depressed, then the control of the CPU 52 returns to step S5 so that the processing beginning with step S5 is thereafter executed repetitively.

The user will adjust the position of the user itself so that the face thereof may just fit in each of the elliptical areas A and B. Then, when the user confirms that a desired image is displayed on the LCD unit 21, the user will depress the shutter button 10. If it is discriminated in step S9 that the shutter button 10 is depressed, then the control of the CPU 52 advances to step S10, in which the CPU 52 stores the image data composed by the graphic chip 81 into the HDD 56. Then, the control of the CPU 52 returns to step S5 so that the processing beginning with step S5 is thereafter executed repetitively.

That the value of a is varied in accordance with the expression (2) given hereinabove between the radii $R_1$ and $R_2$ of the concentric circles signifies that the value of a is varied along a curve $L_1$ of FIG. 24. This curve $L_1$ represents a sine (cosine) function. Accordingly, the value α varies smoothly in the proximity of $r=R_1$ and $r=R_2$, and the images can be composed naturally.

Figure 24:
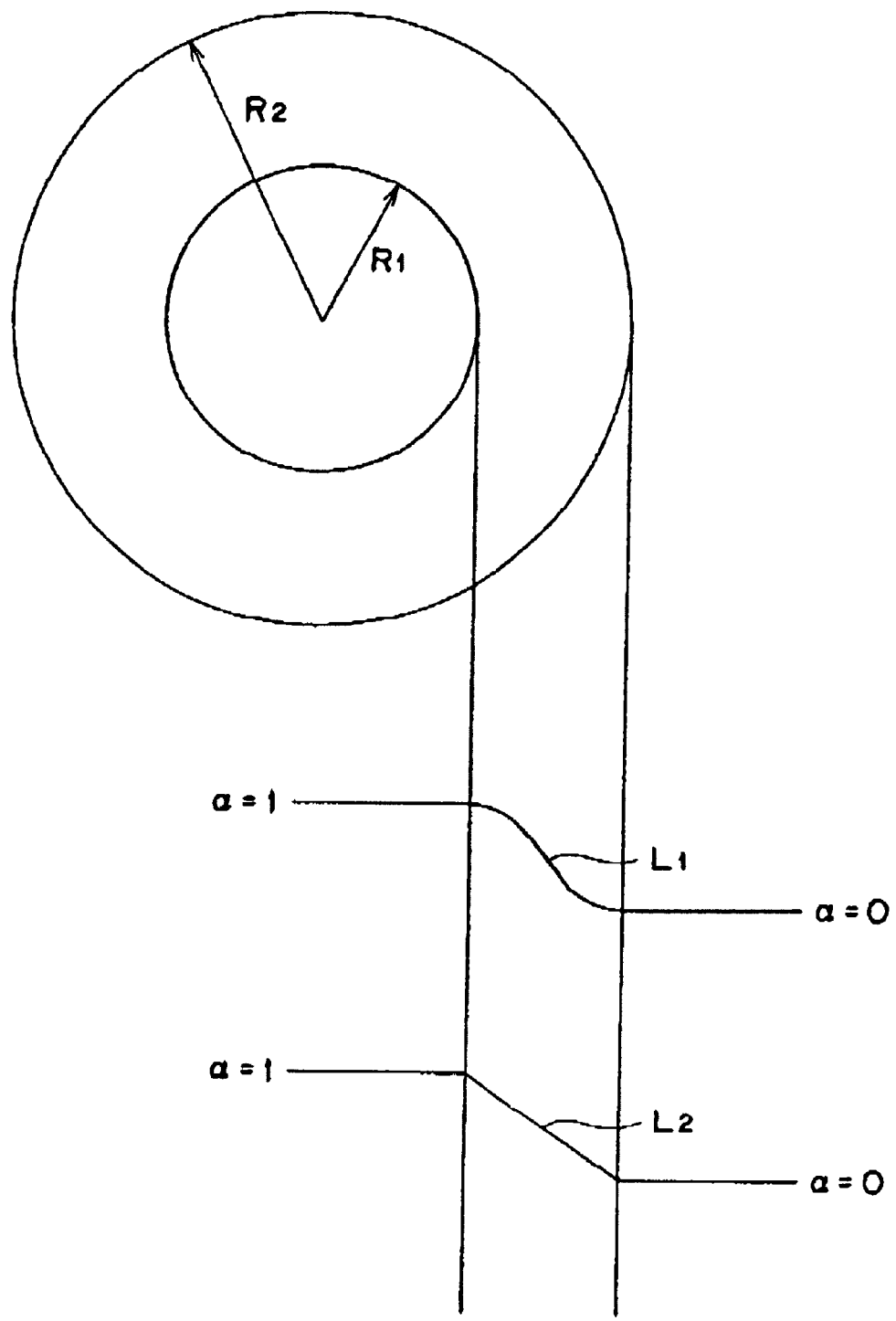
FIG. 24 is a diagrammatic view illustrating a variation of the value of a which is a factor used in the portable personal computer of FIG. 1.

On the other hand, if the value of a is varied linearly as indicated by, for example, a straight line $L_2$ in FIG. 24, then the value of α varies suddenly in the proximity of $r=R_1$ and $r=R_2$ and a composite image becomes unnatural. Therefore, the value of α is preferably varied in accordance with the expression (2).

It is to be noted that, while, in the present embodiment, the faces of persons in the elliptical areas are replaced with each other, the shapes and the number of elliptical areas may be changed suitably such that only the eyes, nose, mouth or ears which are parts of the face may be replaced.

Further, only it is required that composite image data between original image data and image data which are reversed horizontally leftwardly and rightwardly or vertically upwardly and downwardly from the original image data be obtained, and, for example, it is otherwise possible to extract, from original image data, those original image data which are at positions symmetrical with respect to a line and are necessary for composition of pixels and perform composition for each pixel using the extracted original image data as reversed image data.

Further, a providing medium for providing a computer program for execution of the processing described above to a user may be an information recording tedium such as a magnetic disc or a CD-ROM or a transmission medium such as the Internet or a network which makes use of a digital satellite.

While a preferred embodiment of the present invention has been described using specific terms, such description is for illustrative purposes only, and it is to be understood that changes and variations may be made without departing from the spirit or scope of the following claims.

What is claimed is:

1. An information processing apparatus which composes an image, comprising:

image pick-up means for picking up an object image including two or more replacement areas disposed at positions symmetrical with respect to an imaginary reference line;

conversion means for converting the replacement areas into circles;

calculation means for calculating a composition ratio, which gradually varies the proximity of the boundary of the area along an imaginary line perpendicular to a tangential line to the circles, for each position;

composition ratio storage means for storing the composition ratios of individual pixels in the replacement areas corresponding to the individual positions;

storage means for temporarily storing image data produced by said image pick-up means as original image data;

production means for producing data of reversed images symmetrical with respect to the imaginary reference line based on the original image data stored in said storage means;

composition means for composing the replacement areas on the original image and the replacement areas on the reversed image for the individual pixels based on the composition ratios; and display means for displaying the composite image data obtained by said composition means.

2. An information processing apparatus according to claim 1, wherein the composition ratios are calculated in accordance with the following expression;

$$\alpha=(\cos((r-R_1)\times\pi/(R_2-R_1))+1)/2.$$

3. An information processing apparatus according to claim 1, wherein the replacement areas have an elliptical shape.

4. An information processing apparatus according to claim 9, wherein the composition ratios are calculated in accordance with the following expression:

$$\alpha=(\cos((r-R_1)\times\pi/(R_2-R_1))+1)/2.$$

5. An information processing apparatus according to claim 2, wherein said production means produces the reversed image data each time new original image data is stored into said storage means.

6. An information processing apparatus according to claim 5, further comprises:

permanent storage means for permanently storing the composite image data; and storage instruction means for instructing said permanent storage means to store the composite image data.

7. An information processing apparatus according to claim 1, further comprising setting means for setting a geometrical attribute to the replacement areas to be composed by said composition means.

8. An information processing apparatus according to claim 7, wherein the geometrical attribute of the replacement areas is a shape of the replacement areas.

9. An information processing apparatus according to claim 7, wherein the geometrical attribute of the replacement areas is a number of the geometrical replacement areas.

10. An information processing apparatus which composes an image, comprising:

original image storage means for storing original image data corresponding to an original image;

composition object image storage means for storing composition object image data to be composed in replacement areas of a predetermined shape on the original image;

conversion means for converting the replacement areas into circles;

calculation means for calculating a composition ratio, which gradually varies the proximity of the boundary of the area along an imaginary line perpendicular to a tangential line to the circles, for each position;

composition ratio storage means for storing the composition ratios of individual pixels in the replacement areas corresponding to the individual positions; and composition means fox composing the replacement areas on the original image and the replacement areas on the reversed image for the individual pixels based on the composition ratios.

11. An information processing apparatus according to claim 10, wherein the composition ratios are calculated in accordance with the following expression:

$$\alpha=(\cos((r-R_1)\times\pi/(R_2-R_1))+1)/2.$$

12. An information processing apparatus according to claim 11, wherein the replacement areas have an elliptical shape.

13. The information processing apparatus according to claim 1, wherein the composition ratio is at least one of a sine function and a cosine function.

14. The information processing apparatus according to claim 10, wherein the composition ratio is at least one of a sine function and a cosine function.

* * * * *